US005619724A

United States Patent [19]
Moore

[11] Patent Number: 5,619,724
[45] Date of Patent: Apr. 8, 1997

[54] SYSTEM FOR ASSIGNING A UNIQUE IDENTIFIER TO COMPONENTS BY STORING A BIT SEQUENCE FROM A SELECTED BIT LINE AFTER DETECTING A PREDETERMINED SEQUENCE OF DATA

[75] Inventor: Terrill M. Moore, Trumansburg, N.Y.

[73] Assignee: Databook Incorporated, Ithaca, N.Y.

[21] Appl. No.: 288,401

[22] Filed: Aug. 10, 1994

[51] Int. Cl.[6] ................................................ G06F 13/00
[52] U.S. Cl. ......................... 395/829; 395/310; 395/839
[58] Field of Search .................................... 395/828, 829, 395/830, 481, 839, 310; 364/900, 939.5

[56] References Cited

U.S. PATENT DOCUMENTS

| 4,016,369 | 4/1977  | Pedersen        | 179/15  |
|-----------|---------|-----------------|---------|
| 4,181,909 | 1/1980  | Pyeatte et al.  | 340/147 |
| 4,214,302 | 7/1980  | Schmidt         | 364/200 |
| 4,360,870 | 11/1982 | McVey           | 364/200 |
| 4,373,181 | 2/1983  | Chisholm et al. | 364/200 |
| 4,426,685 | 1/1984  | Lorentzen       | 364/900 |
| 4,773,005 | 9/1988  | Sullivan        | 364/200 |
| 4,849,931 | 7/1989  | Ishii et al.    | 364/900 |
| 4,964,038 | 10/1990 | Louis et al.    | 364/200 |
| 5,175,822 | 12/1992 | Dixon et al.    | 395/275 |
| 5,274,771 | 12/1993 | Hamilton et al. | 395/275 |
| 5,359,719 | 10/1994 | Chang et al.    | 395/400 |
| 5,367,640 | 11/1994 | Hamilton et al. | 395/275 |
| 5,404,460 | 4/1995  | Thomsen et al.  | 395/275 |
| 5,428,748 | 6/1995  | Davidson et al. | 395/275 |
| 5,428,752 | 6/1995  | Goren et al.    | 395/325 |
| 5,437,019 | 7/1995  | Brockmann       | 395/400 |
| 5,455,923 | 10/1995 | Kaplinsky       | 395/481 |

OTHER PUBLICATIONS

Dallas Semiconductor; DS1222 BankSwitch Chip; CMOS circuit designed to select one of sixteen memory banks under software control. (pp. 685–689, DS1222, Jun. 5, 1990).

Intel Corporation; Multipbus II Bus Architecture Specification. (Ch. II, Intel iPSB™ Bus Specification, sheets 2–25 and 2–31 through 2–33, 1983).

*Primary Examiner*—Thomas C. Lee
*Assistant Examiner*—Duo Chen
*Attorney, Agent, or Firm*—Nixon, Hargrave, Devans & Doyle

[57] ABSTRACT

A computer system which assigns a unique identifier to each component in the system. The system includes a microprocessor, a memory, and one or more components. The microprocessor and the memory are coupled by first data lines. Each component has a storage device for storing data to uniquely identify each component and second data lines, the second data lines coupled to the first data lines. The storage device includes an identification input which is coupled to a selected one of the second data lines. The storage device in each component stores data from the selected one of the second data lines during the transmission of a sequence of data from the memory on the second data lines. With the system, a unique and consistent identifier can be assigned to each component in a computer system, each time the computer system is started. A separate memory device to store an identifier for each component is unnecessary.

13 Claims, 6 Drawing Sheets

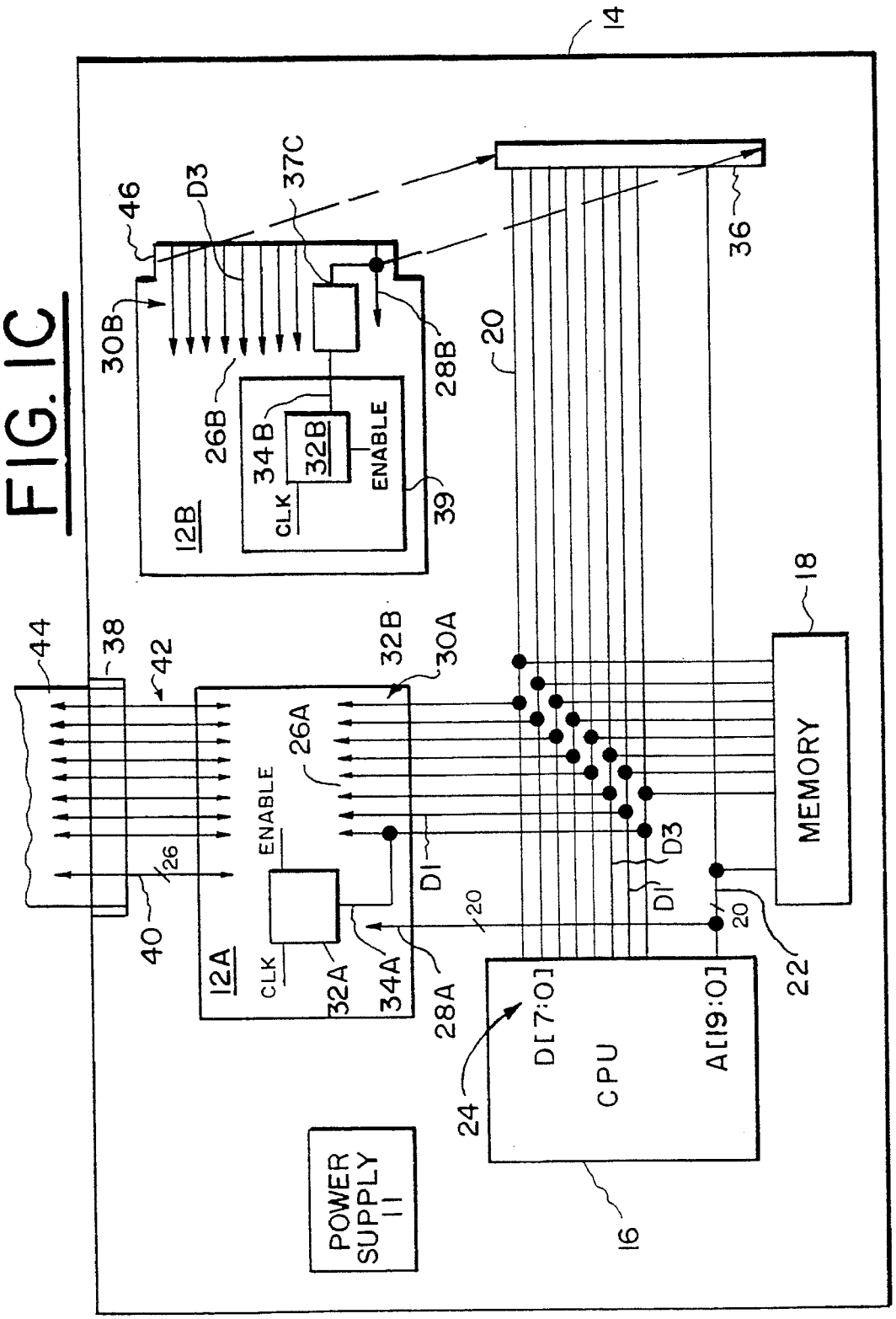
FIG. IC

| CHECK-SUM | SERIAL NUMBER | | | | VENDOR ID | | | |
|---|---|---|---|---|---|---|---|---|
| BYTE 0 | BYTE 3 | BYTE 2 | BYTE 1 | BYTE 0 | BYTE 3 | BYTE 2 | BYTE 1 | BYTE 0 |
| 7:0 | 7:0 | 7:0 | 7:0 | 7:0 | 7:0 | 7:0 | 7:0 | 7:0 |
| 0x00 | 0x00 | 0x00 | 0x00 | CHIP ID | 0x14 | 0x85 | 0x4B | 0x10 |

48 ☐ SHIFT ⇧

FIG. 2

TABLE. WAKE-UP SEQUENCE CONVERTED TO BIT SEQUENCES

| DATA LINE | BIT SEQUENCE | HEXADECIMAL EQUIVALENT |
|---|---|---|
| D0 | 0101011011110110001101000010111 | 56FB0D17 |
| D1 | 1010110111101100011010000101110 | ADF61A2E |
| D2 | 0101101111011000110100001011100 | 5BEC345C |
| D3 | 1011011110110001101000010111001 | B7D868B9 |
| D4 | 0110111101100011010000101110011 | 6FB0D173 |
| D5 | 1101111011000110100001011100111 | DF61A2E7 |
| D6 | 1011110110001101000010111001110 | BEC345CE |
| D7 | 0111101100011010000101110011100 | 7D868B9C |

SYSTEM FOR ASSIGNING A UNIQUE IDENTIFIER TO COMPONENTS BY STORING A BIT SEQUENCE FROM A SELECTED BIT LINE AFTER DETECTING A PREDETERMINED SEQUENCE OF DATA

FIELD OF THE INVENTION

This invention relates generally to an apparatus and method for assigning identifiers to components and, more particularly, to an apparatus and method for assigning a unique identifier to one or more components in a computer system in a Plug and Play ISA environment.

BACKGROUND OF THE INVENTION

In many computer systems, the addition of new add-in cards, peripherals and other components to the system is a difficult procedure for the end user. For each new component that the end user adds, the user must know what resources the new component needs and what resources are currently being used. For example, the user must know which addresses are currently being used by components in the system and which addresses are available. Often the user must pull out the existing components in the system to examine the settings of the jumper blocks or DIP switches to determine what is in use and what is available. As a result, the end user must have a very detailed working knowledge of all of the components in the system. If two or more components are assigned the same resource, the user's computer may stop working, with no indication as to where the problem lies.

Additionally, in many computer systems, "hot" docking of new components into the computer system is not possible. The computer systems must be shut down before any new components can be added. This can be a significant limitation, for example, when using notebook computers with docking stations.

Personal computers based on the Intel architecture, and using the ISA bus, are particular examples of computer systems with such limitations. The desire to offer these computers to a wider variety of consumers, and the need to meet competition from other computer architectures, has made this limitation a matter of pressing interest to the industry.

Recently, Microsoft Corp., and Intel released a specification for a Plug and Play ISA Standard which is designed to address the above-noted problems. When the Standard is implemented in computer systems, components can be installed without setting jumper switches or loading new BIOS software and new components can be added while the system is running.

The Plug and Play ISA Standard operates by placing the assignment of hardware resources under software control. Specifically, memory addresses, input and output (I/O) addresses, interrupt (IRQ) levels, and direct memory access (DMA) channels are all assigned by software. The standard anticipates that each component added to a computer system will have a unique identifier which is used for two purposes.

1. The unique identifier of each component is used as a low-level name for that component by system software. Such a name is used, for example, to associate a drive letter with a given physical slot. For this reason, it is essential that this unique identifier have a constant value for as long as the component is installed in the computer system.

2. The unique identifier is used as part of a hardware component selection algorithm, in order to individually select, in turn, each Plug and Play ISA component in the system. For this reason, it is essential that each Plug and Play ISA component in the system have a different unique identifier.

The Standard defines the identifier as a seventy-two bit sequence. Sixteen bits identify the vendor; sixteen bits identify the type of component; thirty-two bits identify the individual component (providing the so-called "serial number"); and eight bits are used as a checkcode. Under the Standard, the component serial number does not need to be a true serial number, but the number cannot be randomly assigned each time. For the reasons described previously, the serial number must remain the same each time the system starts up for the system to operate properly.

The state of the art in semiconductor manufacturing is such that it is usually not economical to assign a different serial number to a device when that device is manufactured. As a practical matter, all devices of a given type are therefore indistinguishable. For this reason, the standard anticipates that manufacturers will use a separate memory device, such as an $E^2PROM$, for each component to store the identifier. The standard also anticipates that in some cases (e.g, the case in which only one component of a given kind will ever be used in a given system), a component may have a constant unique ID.

The addition of a memory device, such as the $E^2PROM$, for each component in or to be added to the computer system creates several problems. Each memory device adds certain manufacturing and programming costs and takes up valuable space on the system board. The additional cost and space are particularly problematic for portable and laptop computer systems, where cost and space are premium considerations. Additionally, the memory device dissipates additional power.

The standard also anticipates that a vendor might decide to dedicate several pins on component (assumed to be implemented as an ASIC) to supply a "unit number". These pins might select from one of n pre-defined component serial numbers, where $n=2^p$, p being the number of pins reserved for this purpose. For example, if p=three pins are reserved for this purpose, n=eight different components serial numbers can be selected. This approach has several disadvantages. First, ASIC package lead frames increase in cost as pins are added, so the cost of the product may increase. Second, adding three pins may result in jumping to a package with a much larger number of pins (due to restrictions in commonly available packages). Third, the cost of the silicon for an integrated circuit goes up as the square of the number of pins. Finally, this approach has limited flexibility.

Because the Plug and Play ISA standard is a compatible extension of existing ISA bus technology, it is desirable to be able to develop a device that is pin-compatible with older, non-Plug and Play ISA devices, and yet adds the Plug and Play ISA functionality.

It is a general object of the present invention to provide an apparatus and method for assigning a unique identifier to one or more components in a computer system, using at most a single pin on each device. This invention also provides a simple means of designing parts to be used to upgrade existing designs that were not based on Plug and Play ISA functionality to include Plug and Play ISA functions.

SUMMARY OF THE INVENTION

According to the present invention, these and other objects are achieved in a computer system which assigns a unique identifier to one or more components in a computer system and in a method of assigning unique identifiers to one or more components in a computer system. The system and method includes a microprocessor, a memory, and at least one component. The microprocessor and the memory are coupled by first data lines. Each component has a storage device for storing data to uniquely identify each component and also has second data lines. The second data lines are coupled to the first data lines. The storage device includes an identification input which is coupled to a selected one of the second data lines. The storage device in each component stores data from the selected one of the second data lines during the transmission of a sequence of data from the memory on the second data lines, for example during the start-up of the computer system.

In an alternative embodiment, the computer system and method include a microprocessor, a memory and at least one component. The memory is coupled to the microprocessor by first data lines. Each of the components has at least one comparator, at least one generator, at least one memory and second data lines. The second data lines in each component are coupled to the first data lines. The second data lines have at least two data lines which are interchanged to form third data lines. The third data lines are coupled to each of the comparators. Each of the comparators is also coupled to one of the generators by fourth data lines. Each of the comparators compares data on the third data lines during the transmission of a predetermined sequence of data from the memory, for example, during the start-up of the computer system, against data on the fourth data lines from the generator. The comparator responsive to a match between data on the third and fourth data lines stores a unique identifier in the memory coupled to the comparator.

With the present invention, a unique identifier can be assigned to each component in a single computer system. The identifier will remain the same each time the system is started. A separate memory device, such as an E²PROM, for each component is not needed. As a result, the manufacturing and programming cost of a memory device for each component and the space each memory device would take up on the circuit board can be avoided. In the first embodiment, a single pin is required on the component; the data pattern present on that pin during the wake-up sequence determines the unique identifier. In the second embodiment, no pin is required; instead, the particular order of data bits determines the unique identifier.

BRIEF DESCRIPTION OF THE DRAWINGS

For a better understanding of the present invention, together with other and further objects, advantages and capabilities thereof, references made to the accompanying drawings, which are incorporated herein by reference and in which:

FIG. 1C is a third schematic diagram of a computer system with components in accordance with yet another embodiment of the present invention;

FIG. 2 is a diagram of a seventy-two bit identifier for the Plug and Play ISA Standard;

FIG. 3 is a table of a wake-up sequence for the Plug and Play Standard converted to bit sequences.

DETAILED DESCRIPTION OF THE INVENTION

Figure 1A:
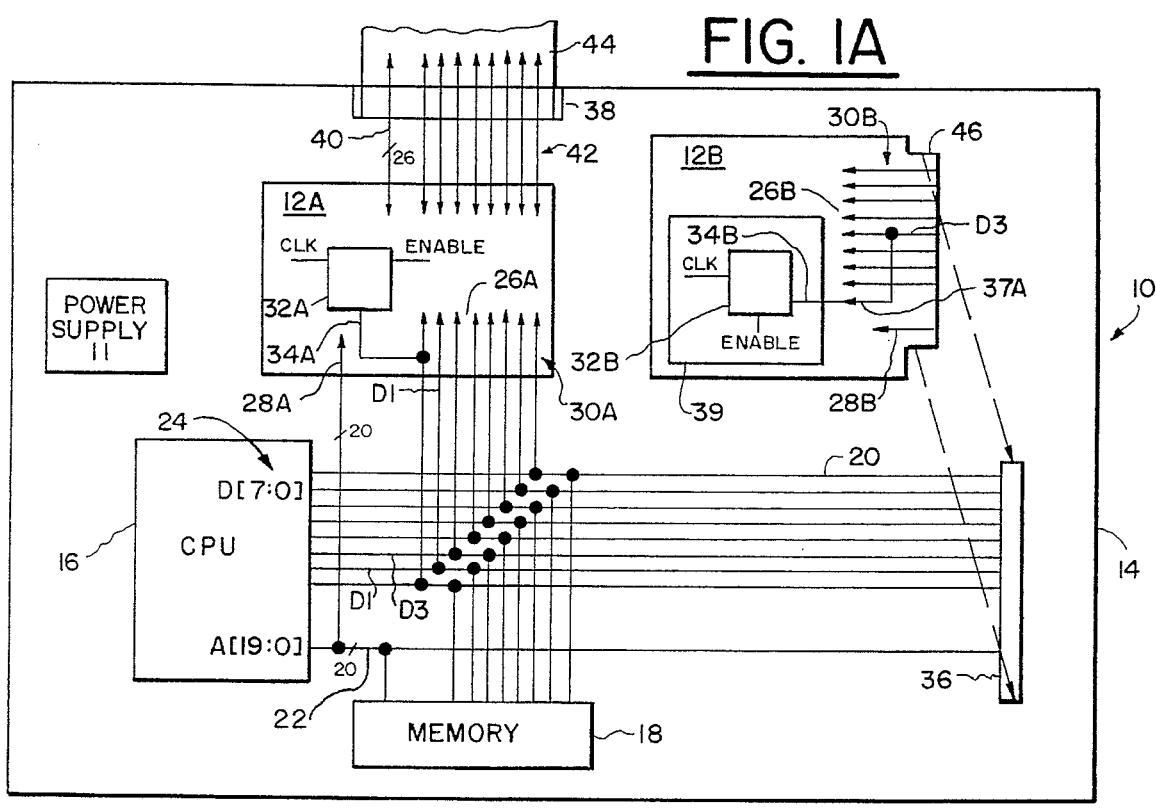
FIG. 1A is a schematic diagram of a computer system with components in accordance with the present invention.

A computer 10 with one or more assemblies 12 in accordance with the present invention is illustrated in FIG. 1. With the present invention, each assembly 12 in a single computer 10 will be assigned a unique identifier during the transmission of a wake-up sequence. None of the assemblies 12 requires a separate memory device, such as an E²PROM, to store an identifier. Eliminating the need for a separate memory device for each assembly 12 saves space on each assembly 12 and saves manufacturing and programming costs associated with the memory device. The identifier for each assembly 12 remains the same every time the computer 10 is started. Optionally, the system may also contain components 12 which use an E²PROM or other fixed or programmable memory device to store their unique IDs, and may contain other components which do not participate in the unique IDs protocol. Within the context of this invention, it will be clear to one skilled in the art that assembly 12 may be integrated into the mother board 14.

Referring to FIG. 1A, the computer 10 includes the mother board 14 with a power supply 11 which provides power for computer 10, a microprocessor 16 coupled to at least one assembly 12, a memory 18, and an optional one or more card/slots 36 via an industry standard architecture (ISA) bus 20. In this particular embodiment, there are two components 12A and 12B as explained in greater detail below. The memory 18 includes read-only-memory (ROM) as well as random-access-memory (RAM). The ISA bus 20 is an expansion bus and includes address and data lines 22 and 24. In this particular embodiment, the ISA bus 20 has twenty address and eight data lines 22 and 24 although the number of address and data lines can vary. The data lines 24 are individually identified as D7 through D0 (D[7:0]) in this embodiment.

Each assembly 12 has an internal bus 26 with address line 28 and data lines 30 and a storage device 32 having a clock input CLK, an enable input ENABLE, and at least one identification input or chip select input 34. In this particular embodiment, component 12A has an internal bus 26A with address and data lines 28A and 30A and a storage device 32A having a clock input CLK, an enable input ENABLE, and at least one identification input or chip select input 34A. Likewise component 12B has an internal bus 26B with address and data lines 28B and 30B and a storage device 32B having a clock input CLK, an enable input ENABLE, and at least one identification input or chip select input 34B. Data lines 30A and the data lines 30B are individually identified as D7 through D0 (D[7:0]). Address lines 28A and address lines 28B are each coupled to address lines 22 and data lines 30A and data lines 30B are each coupled to data lines 24, when the components 12A and 12B are coupled to the board 14. In this particular embodiment, component 12B is shown disconnected from the board 14. Although only 8 data bits and 20 address bits are shown, the embodiment may provide additional address and data bits. In the specific case of a Plug and Play ISA or Plug and Play VL-Bus implementation, the wake-up sequence is always transmitted on a specific 8-bit subset of a wider data bus. For clarity, only those bits are discussed in this particular embodiment.

Connections to the CLK and ENABLE inputs for each storage device 32 and their operation are well known in the art and accordingly are not illustrated in FIG. 1A. For example, if a Plug and Play ISA system is being implemented, the CLK and ENABLE signals for the CLK and ENABLE inputs could be generated by detecting writes to the dedicated Plug and Play ISA wake-up I/O port and comparing then for a match with a predetermined sequence in a memory device or from a generator (not shown).

The identification input 34 is coupled to one of the data lines 30 in assembly 12. In this particular embodiment, identification input 34A is coupled to the data line D1 of data lines 30A and identification input 34B is coupled to the data line D3 of data lines 30A. Each storage device 32A and 32B is an eight-bit shift register, although other types of storage or memory devices could be used.

The computer 10 can have more or fewer components than the two components 12A and 12B shown. In this particular embodiment, the component 12A is a controller chip, such as a PCMCIA controller chip, and component 12B is an add-in card. Since the component 12A in this embodiment is a PCMCIA controller chip, a PCMCIA slot 38 is shown coupled to component 12A by twenty-six address lines 40 and eight data lines 42. A PCMCIA card 44 is installed in the PCMCIA slot 38. Although only one PCMCIA slot 38 is shown, the controller chip 12A may be able to control more than one PCMCIA slot 38. Component 12B has a connector 46 which fits in the card/slot 36 and couples the internal bus 26B to the ISA bus 20 and is disconnected in this embodiment. Although the storage device 32B is shown on component 12B, the storage device 32B could be located elsewhere, such as on the mother board 14 near the card/slot 36 with the identification input 34B coupled to one of the data lines 24.

With the Plug and Play ISA Standard, released by Microsoft Corp., and Intel, and incorporated herein by reference, users can attach and detach components, for example by loading notebook computers into and out of docking stations, without reconfiguring the computer 10 or loading new BIOS software. To accomplish this, the standard requires each component to have a unique seventy-two bit identifier 48. The format for the identifier for the Plug and Play Standard is shown in FIG. 2 and provides information on the Serial Number and Vendor ID, as well as a checksum. The Serial Number is comprised of four bytes with Byte 0 in this embodiment being the Chip ID. In this embodiment, the Chip ID is eight bits. The Plug and Play ISA Standard anticipates that a separate memory device, such as an E$^2$PROM, will be used for each component 12A and 12B to store the unique identifier, including the Serial Number. Although the seventy-two bit identifier 48 used by the Plug and Play Standard is shown, identifiers 48 of different lengths and representing different information could be used.

Whenever the computer 10 is started, or as required by operating software, a predetermined sequence of data is transmitted to a predetermined I/O address. In this particular embodiment, the predetermined sequence of data is the wake-up sequence of the Plug and Play Standard and it is written sequentially to I/O address 0×279. The wake-up sequence in the Plug and Play Standard in hexadecimal code is 6A, B5, DA, ED, F6, FD, 7D, BE, DF, 6F, 37, 1B, 0D, 86, C3, 61, B0, 58, 2C, 16, 8B, 45, A2, D1, E8, 74, 3A, 9D, CE, E7, 73, and 39. Although one particular predetermined sequence of data and one I/O address is described, other sequences and addresses could be used. Although a sequence of 8-bit operations is described, a sequence of 16-bit, 32-bit or any other width operations could be used, with a predetermined sequence of data. As will be explained in greater detail below, the only requirement for the predetermined sequence of data is that the bit sequence on at least two of the data lines D[7:0] must be unique. The number of unique patterns on individual data lines will determine the number of unique IDs possible in a given implementation.

The predetermined sequence of bits which are transmitted along each of the data lines of data lines 24 to the data lines of data lines 30 in this particular embodiment are shown in FIG. 3 under the column heading "Bit Sequence." Each sequence of bits on each data line D7 to D0 in the table 50 is unique. In particular, the last eight bits on each data line D7 to D0 are unique.

When the computer 10, shown in FIG. 1A, is started, or as required by operating software, a predetermined sequence of data is transmitted from the memory 18 to a predetermined I/O address by the data lines 24 to the data lines 30. Each assembly 12 (if coupled to the ISA bus 20) is "listening" at the predetermined I/O address for the predetermined sequence of data and will deny access to the component's control registers until the transmission of the predetermined sequence of data is received. In this particular embodiment, the bit sequences shown in FIG. 3 are transmitted on data lines 24 to data lines 30A and data lines 30B. For example, data line D0 in data lines 24, data lines 30A, and data lines 30B will receive sequentially: 01010110111110110000110100010111, data line D1 in data lines 24, data lines 30A, and data lines 30B will receive sequentially 10101101111101100001101000101110, and data line D3 in data lines 24, data lines 30A, and data lines 30B will receive sequentially 10110111110110000110100010111001. The sequence of bits on the others data lines D2 and D4–D7 are shown in the table in FIG. 3.

While the sequence of data is being transmitted along the data lines 24 to data lines 30A and data lines 30B, the data on data line D1 of data lines 30A is being transmitted to the storage device 32A and the data on the data line D3 of data lines 30B is being transmitted to the storage device 32B. Each storage device 32 is enabled during the transmission of the predetermined sequence of data and stores the data input via identification input 34. Since the storage devices 32A and 32B are eight bit shift registers in this particular embodiment, the bit sequences pass sequentially through the registers and the registers store the last eight bits of the bit sequence. When the wakeup sequence is over storage device 32A will have stored the last eight bits, 00010111, from data line D0 and storage device 32B will have stored the last eight bits, 10111001, from data lines D3. In this particular embodiment, the last eight bits in storage devices 32A and 32B are used as Byte 0 in the Serial Number for the identifier 48 shown in FIG. 2. Although only the last eight bits transmitted are stored, fewer or more bits could be stored from each data line, as long as each stored sequence is unique. In this embodiment, bytes 0 through 3 of the Vendor ID, and bytes 1 through 3 of the Serial Number are hardwired into the device; the checksum byte is computed by the device based on the effective unique ID.

Each component 12A and 12B has a unique Byte 0 in the Serial Number and thus a unique identifier 48 because each identification input 34A and 34B is coupled to a different data line D[7:0] of data lines 30A and data lines 30B, each of which has a unique data stream as shown in FIG. 3. Although not shown, one of the data lines 30A or one of the data lines 30B could also be coupled to ground or to a low negative reference potential or could be coupled to $V_{cc}$ or a positive reference potential. With this particular embodiment, there are at least ten unique identifiers 48 which can be obtained.

With only slight variations there are almost an endless numbers of unique identifiers 48 which could be generated. For example, by simply adding a logic device 37A such as an inverter between each identification input 34A and 34B and the data line D[7:0] of data lines 30A and 30B coupled to the input 34A and 34B, the number of unique identifiers 48 can almost be doubled.

More generally, logic device 37B can be a combinatorial or sequential function of one or more of the data lines D[7:0], and other system variables, so long as said function produces a bit sequence during the wake-up sequence, said bit sequence being both repeatable and different from any of the bit sequences present at the other identification inputs 34 in the system 14.

Once each component 12A and 12B has a unique identifier 48, the software can identify each component 12A and 12B, allocate the appropriate resources for each component 12A and 12B. The software can also assign a unique identifier and allocate resources to assemblies 12 as they are added to the computer 10, without shutting the computer 10 down. The identifier 48 stored for each component 12A and 12B remains the same each time the computer 10 is shut down and reinitiated because the same predetermined sequence of data is transmitted each time.

Although each of the identification inputs 34A and 34B for the storage devices 32A and 32B, shown in FIG. 1A, are wired to different data lines 30, two or more components 12A and 12B could be wired to the same data line D[7:0] of data lines 30A and 30B and still be uniquely identified. Under the standard the first thirty-two bits in the identifier 48 identify the Vendor ID. Thus, even if the Serial Number was the same, if the Vendor ID is different then the first thirty-two bits of the identifier 48 will be different.

With the present invention, a memory device, such as the E²PROM, for each component 12A and 12B is unnecessary. Eliminating the need for a separate memory device for each component 12A and 12B saves valuable space on the mother board 14, reduces the overall manufacture and programming costs, and reduces the amount of power dissipated in the computer system 10.

Figure 1B:
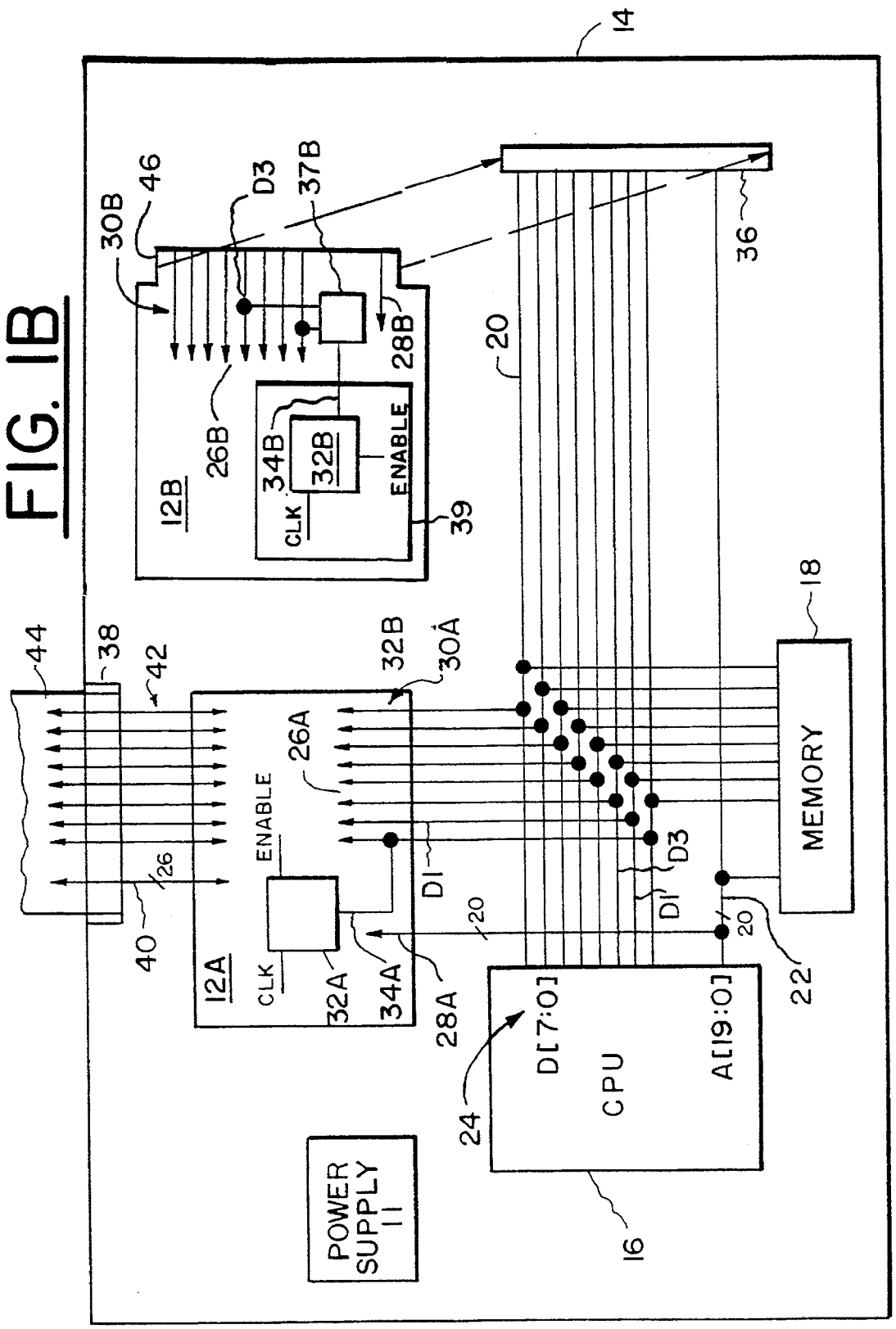
FIG. 1B is a second schematic diagram of a computer system with components in accordance with another embodiment of the present invention.

Referring to FIG. 1B, an alternative embodiment for the identification input 34A of storage device 32A is shown. The identification input is wired to logic ground, causing zeroes to be loaded into the storage device. Also, an alternative embodiment for component 12B is shown, where the logic device 37B is coupled to D0 and D3, and produces the logical exclusive-OR of lines D0 and D3. Although two data lines and an exclusive-OR function are shown, one skilled in the art will recognize that logic device 37B can be connected to any number of data lines D0 through D7. Although logic device 37B is shown an exclusive-OR device, one skilled in the art will recognize that any combinatorial or sequential function can be utilized, as long as the same bit sequence is presented to the identification input 34B every time the wake-up sequence is issued by the CPU.

Referring to FIG. 1C, yet another alternative embodiment for the identification input 34A of storage device 32A is shown. The identification input is wired to a logic high level, causing ones to be loaded into the storage device 32A every time the wake-up sequence is issued by the CPU.

Also referring to FIG. 1C, component 12B is configured to show how non-Plug and Play ISA components can be upgraded to Plug-and-Play ISA compliance using this invention. We assume that component 12B was designed as a non-Plug and Play ISA component, with address decoding performed by logic device 37C as a function of the address present on the ISA bus. Logic device 37C presents a logic true level to the chip-select input 34B of component 39. By designing a new component 39 incorporating this invention, and assigning the identification input 34B to the same physical pin as was used by old component 39 as its chip-select input, we can arrange to directly substitute the new device incorporating this invention for the old device. The chip select decoder device 37C will always produce a constant value during the Plug and Play ISA wake up sequence, and therefore storage device 32B will be loaded with a constant value (either all ones or all zeros, depending on the constant value produced by device 37C). One skilled in the art will recognize that the chip-select decoder may be based on other system control signals.

Figure 4:
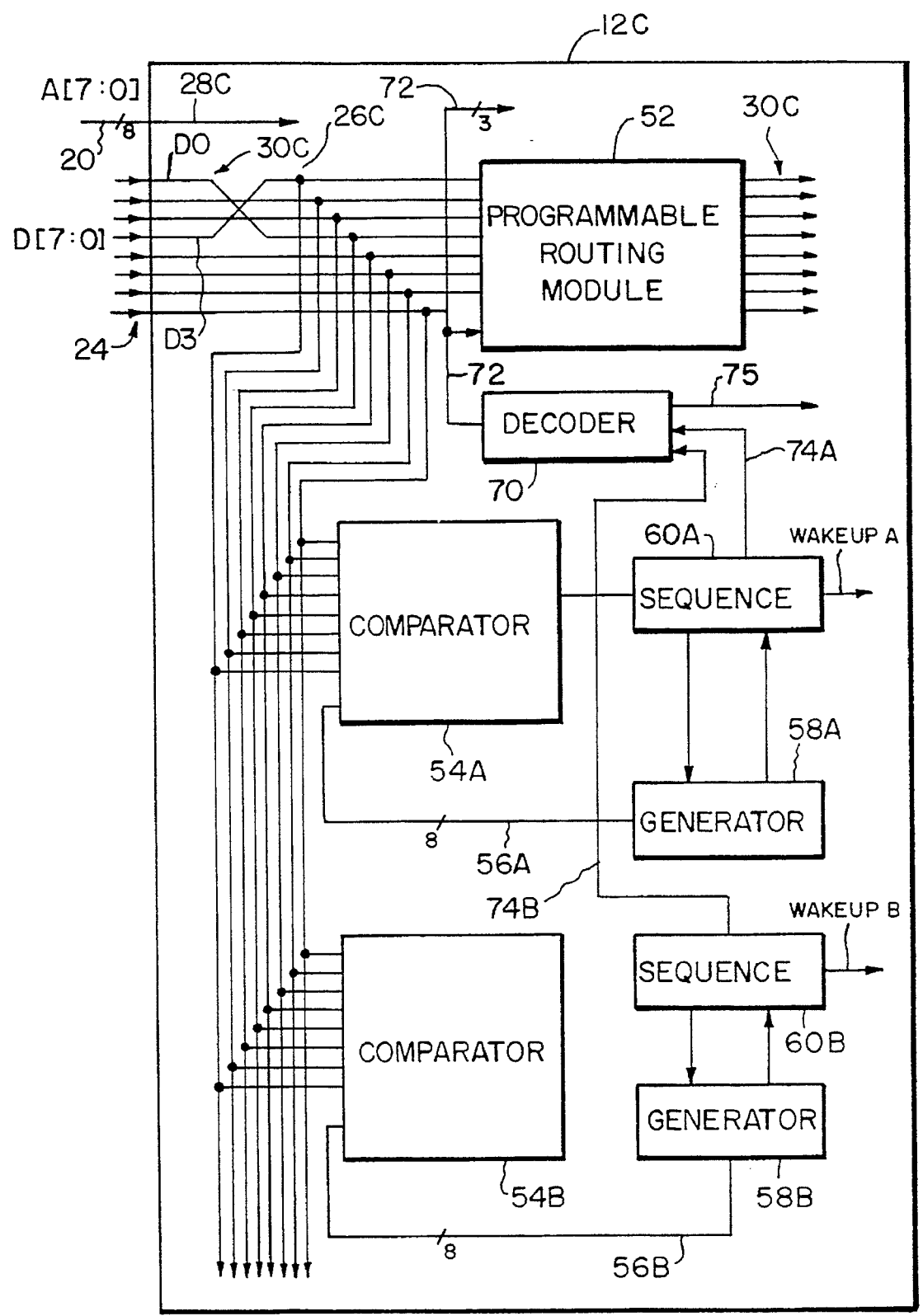
FIG. 4 is a schematic diagram of an alternative embodiment for a component in the computer system in accordance with the present invention.

Referring to FIG. 4, an alternative embodiment for the component 12C is shown. The address lines 22 are coupled to the address lines 28C and the data lines 24 are coupled to the data lines 30C. At least two of the data lines 30C are interchanged to form data lines 30C'. In this particular embodiment, data lines 30C are interchanged to form data lines 30C' by coupling D0 of data lines 30C to data line D3 of data line 30C and by coupling data line D3 of data lines 30C to data line D0 of data lines 30C.

Data lines 30C' are coupled to a programmable routing logic module 52. The routing logic module 52 interchanges the data lines 30C' back to form data lines 30C according to the binary value present on the Unique Code bus 72, in order to correct the transmission of data to the rest of the circuitry (not shown) in the component 12C. The routing logic module 52 also interchanges data from circuitry (not shown) in the component 12C back to the order of data lines 30C' for transmission out of the component 12C.

At least one comparator 54 is coupled to data lines 30C'. In this particular embodiment, two comparators 54A and 54B are shown coupled to data lines 30C', although the component 12C could have more than the two comparators 54A and 54B coupled to data lines 30C'. Each comparator 54 is also coupled to a generator 58. In this particular embodiment, comparator 54A is coupled to a generator 58A by data lines 56A and comparator 54B is coupled to a generator 58B by data lines 56B. Each of the data lines 56A and 56B have eight data lines D[7:0] in this embodiment.

Each generator 58 generates or has stored the predetermined sequence of data transmitted by the computer 10 and interchanges at least two of the data lines D[7:0] to form data lines 56. In this particular embodiment, data lines D0 and D2 are interchanged to form data lines 56A and data lines D0 and D3 are interchanged to form data lines 56B. A feedback shift register may be used for each generator 58A and 58B, although other types of registers and storage devices could be used. In this embodiment, for clarity, each generation and comparison module is shown as being completely independent; other implementations might extract common logic into a common module whose functions are shared by each generation or comparison module.

The output of each comparator 54 is coupled to a sequencer 60. In this particular embodiment, the output of comparator 54A is coupled to a sequencer 60A and the output of comparator 54B is coupled to a sequencer 60B. Each sequencer 60A and 60B can store Byte 0 for the Chip ID of the Serial Number. In this particular embodiment, each sequencer 60A and 60B is implemented using logic gates and flip-flops. Each sequencer 60 is also coupled to the generator 58, and can cause the generator 58 to advance to its next value in sequence. In this implementation, each sequencer 60 can also cause the generator 58 to return to the beginning, as required by the Plug and Play ISA Standard. In other embodiments, each sequencer 60 might have additional different functions. Finally, at the completion of a successful initialization sequence, one (and only one) of the sequencers 60 issues instructions to the Decoder 70, by placing its Completion output 74 in a logic true state.

Decoder 70 in turn generates a single 3-bit code, determined according to which of the sequencers has completed. In other embodiments, a one-of-eight code might be used or additional storage or computation might be present in the decoder. Additionally, the unique code used to form the device's Unique Identifier might be generated independently of the control lines for the Programmable Routing Module 52 (again based on the states of sequencers 60).

When the computer 10 is started, or as required by operating software, the predetermined sequence of data is transmitted from the memory onto data lines 24 to data lines 30C. In this particular embodiment, the sequence of bits transmitted on each data line D0 through D7 on data lines 30C is shown in FIG. 3. Since data lines D0 and D3 of data lines 30C are interchanged to form data lines 30C', then the bit sequence on data line D0 is now on data line D3 and the bit sequence on data line D3 is on data line D0.

Each comparator 54 is coupled to the data lines 30C' and also to one generator 58. Each generator 58 stores or generates the same predetermined sequence of data as stored in memory 18. In this embodiment, the generators 58A and 58B each generate the bit sequences for each data line as shown in FIG. 3. In this embodiment, data lines D0 and D2 are interchanged to form data lines 56A and data lines D0 and D3 are interchanged to form data lines 56B. Accordingly, the bit sequence on data line D0 of data lines 56A is the bit sequence for data line D2 and the bit sequence on data line D2 of data lines 56A is the bit sequence for data line D0 and the bit sequence on data line D0 of data lines 56B is the bit sequence for data line D3 and the bit sequence on data line D3 of data lines 56B is the bit sequence for data line D0.

Each comparator 54 compares the data on data lines D0 through D7 on data lines 30C' with the data on data lines D0 through D7 on data lines 56. Specifically, each comparator 54 compares the data on data line D0 of data lines 30C' with data line D0 of data lines 56, compares the data on data line D1 of data lines 30C' with data line D1 of data lines 56, and so on. In this embodiment, comparator 54A will not find a match because the bit sequences on data lines D0, D2 and D3 of data lines 30C' will not match with the bit sequences on data lines D0, D2 and D3 of data lines 56A. However, comparator 54B will find a match because the bit sequences on each data line 30C' will match the bit sequences on each data line 56B.

When a comparator 54 has found a match, the sequencer 60 coupled to the comparator 54 signals that it has found a match on output signal 74. It should be obvious that only one sequencer 60 can enter this state at a given time. It should also be obvious that the particular sequencer 60 that becomes active is determined by the particular correspondence between data bits D[7:0] on bus 30C, and data lines D[7:0] on bus 30C'. Therefore, the decoder 70 has enough information to generate a routing control code Unique Code bus 72 for the programmable routing module 52, and also to generate a unique eight bit code on bus 75 which is used as Byte 0 for the Serial Number for the identifier 48. The value of this unique code in this embodiment is a simple binary integer in the range zero through seven (binary pattern 00000000 through 00000111), corresponding to 30C D[0] being connected to 30C' D[0], D[1], and so forth through D[7]. In this example 30C D[0] is connected to 30C' D[3], so the unique code 00000011 will be generated.

To correct for the interchange in data lines 30C to form data lines 30C', the decoder 70 instructs Programmable routing module 52 to interchange data lines D0 with data line D3 in data lines 30C' to form data lines 30C again. As a result, the order in which data is sent on data lines 30C to the component 12C is corrected after the interchange. The routing logic module 52 also interchanges the data lines 30C in the component 12C to form data lines 30C' for transmission of data from the component's internal circuitry out.

Having thus described the basic concept of the invention, it will be readily apparent to those skilled in the art that the foregoing detailed disclosure is intended to be presented by way of example only, is not limiting. Various alterations, improvements and modifications will occur and are intended to those skilled in the art, but not expressly stated herein. These modifications, alternations and improvements are intended to be suggested hereby, and are within the spirit and scope of the invention. Accordingly, the invention is limited only by the following claims and equivalents thereto.

What is claimed is:

1. A computer system, the system comprising:

a microprocessor;

a memory, said memory coupled to said microprocessor by at least two first data lines;

one or more components, each of said components having: (i) at least two second data lines, said second data lines in each of said components coupled to said first data lines; and (ii) a storage device for holding a sequence of bits to distinguish the component from other components; and each of said storage devices including an identification input coupled to a selected source, said source comprising one of said second data lines, each of said storage devices storing the sequence of bits from said selected source coupled to said identification input during the transmission of a predetermined sequence of data in said memory on said second data lines.

2. The system as set forth in claim 1 wherein said system has at least two components and each of said components is coupled to a different selected source.

3. The system as set forth in claim 1 wherein each said storage device is an eight-bit shift register.

4. The system as set forth in claim 1 wherein said component is a PCMCIA controller chip.

5. The system as set forth in claim 1 further comprising a card/slot coupled to the first data lines and wherein said component is an add-in card which can be coupled to the first data lines when connected in said card/slot.

6. The system according to claim 1, wherein the said predetermined sequence of data comprises the following sequence of hexadecimal data: 6A, B5, DA, ED, F6, FD, 7D, BE, DF, 6F, 37, 1B, 0D, 86, C3, 61, B0, 58, 2C, 16, 8B, 45, A2, D1, E8, 74, 3A, 9D, CE, E7, 73, and 39.

7. A computer system, said system comprising:

a microprocessor;

a memory, said memory coupled to said microprocessor by at least two first data lines;

at least one component, with each of said components having at least one comparator, at least one generator, at least one storage device and at least two second data lines, said second data lines coupled to said first data lines;

said second data lines having at least two data lines which are interchanged to form third data lines;

said third data lines coupled to each of said comparators; and each of said comparators coupled to one of said generators by fourth data lines, each of said comparators comparing first sequences of bits on each of said third data lines during the transmission of a predetermined sequence of data form the memory on said third data lines against second sequences of bits on each of said fourth data lines from said generator, said one of said comparators responsive to a match between bits on each of said third and fourth data lines storing a unique identifier in said storage device coupled to said comparator.

8. The system as set forth in claim 7 further comprising a routing device coupled to said third data lines, said routing device interchanging said third data lines to form said second data lines.

9. A method for assigning a unique identifiers in a computer system, the system having a microprocessor, a memory and at least one component, the microprocessor and the memory coupled by at least two first data lines, each of the components having at least two second data lines and a storage device, the second data lines coupled to the first data lines and the storage device for storing data that uniquely identifies each component from other components, the storage device having an identification input coupled to a selected one of the second data lines, said method comprising the steps of:

transmitting a sequence of data in the memory on the first data lines to each of the components on the second data lines;

enabling the storage device; and storing a sequence of bits in the storage device from the selected one of said second data lines coupled to the identification input.

10. The method according to claim 9 further comprising the step of disabling each of the storage devices when the transmission of the sequence of data is completed.

11. The method according to claim 9 wherein the step of transmitting the sequence of data comprises transmitting the following sequence of hexadecimal data: 6A, B5, DA, ED, F6, FD, 7D, BE, DF, 6F, 37, 1B, 0D, 86, C3, 61, B0, 58, 2C, 16, 8B, 45, A2, D1, E8, 74, 3A, 9D, CE, E7, 73, and 39.

12. A method for assigning unique identifiers in a computer system, said system comprising a microprocessor, a memory, and at least one component, the memory coupled to the microprocessor by at least two first data lines, each of the components having at least one comparator, at least one generator, at least one storage device and at least two second data lines, the second data lines in each component coupled to the first data lines, the second, data lines having at least two data lines which are interchanged to form third data lines, the third data lines coupled to each of the comparators, each of the comparators coupled to one of said generators by fourth data lines, said method comprising the steps of:

transmitting first sequences of bits in the memory on each of the first data lines to each of the components, each of the components receives the data on the second data lines which have at least two data lines which are interchanged to form the third data lines and which transfer the first sequences of bits to the third data lines coupled to the comparators;

transmitting second sequences of bits on each of the fourth data lines to each of the comparators;

comparing the first sequences of bits on each of the third data lines against the second sequences of bits on each of the fourth data lines;

generating a signal when one of the comparators finds a match between bits on each of said third and fourth data lines; and storing a unique identifier in the storage device coupled to the comparator finding the match.

13. The method according to claim 12 wherein the step of transmitting the sequence of data comprises transmitting the following sequence of hexadecimal data: 6A, B5, DA, ED, F6, FD, 7D, BE, DF, 6F, 37, 1B, 0D, 86, C3, 61, B0, 58, 2C, 16, 8B, 45, A2, D1, E8, 74, 3A, 9D, CE, E7, 73, and 39.

\* \* \* \* \*